Oct. 13, 1970     H. N. STAATS ET AL     3,533,886

MODULAR LAMINATOR

Filed Aug. 15, 1966     6 Sheets-Sheet 1

Fig.1

INVENTORS
Henry N. Staats
Maurice D. Levitan
Donald P. Vincent

BY *Hill, Sherman, Meroni, Gross & Simpson*
ATTORNEYS

Oct. 13, 1970     H. N. STAATS ET AL     3,533,886
MODULAR LAMINATOR

Filed Aug. 15, 1966                    6 Sheets-Sheet 2

INVENTORS
Henry N. Staats
Maurice D. Levitan
Donald P. Vincent
BY Hill, Sherman, Meroni, Gross & Simpson
ATTORNEYS Oct. 13, 1970     H. N. STAATS ET AL     3,533,886

MODULAR LAMINATOR

Filed Aug. 15, 1966     6 Sheets-Sheet 6

INVENTORS
Henry N. Staats
Maurice D. Levitan
Donald P. Vincent

BY
ATTORNEYS

3,533,886
Patented Oct. 13, 1970

3,533,886
MODULAR LAMINATOR
Henry N. Staats, Deerfield, Maurice D. Levitan, Wilmette, and Donald P. Vincent, Wheeling, Ill., assignors to General Binding Corporation, Northbrook, Ill., a corporation of Illinois
Filed Aug. 15, 1966, Ser. No. 572,606
Int. Cl. B32b 31/18
U.S. Cl. 156—510           4 Claims

ABSTRACT OF THE DISCLOSURE

A laminating apparatus comprising a plurality of individual subcomponent units each formed in a modular manner, the individual units being rectangular with the major dimension being an even multiple of the minor dimension and the lengths of each of the units being the same. The modular system is built up into a rigid unitized laminator apparatus revisable to provide a multitude of over-all laminator functions in a single assemblage.

---

As those skilled in the art of heat-sensitive laminating apparatus are aware, each individual application of laminating film to a product requires, to achieve maximum efficiency, an individually designed laminating machine. This is particularly true in the case of commercial equipment where factors such as speed, temperature, and the like, become extremely important. In the past, it has been standard procedure to design throughout, a new laminating apparatus for each special lamination problem, as it occured. This has been extremely expensive in operation and has made commercial laminating devices extremely expensive. In accordance with the principles of the present invention, the costs of engineering or designing any given laminating apparatus to suit a special laminating problem has been reduced to an absolute minimum. Additionally, in accordance with the present invention, the cost of construction of special order laminating apparatus has been substantially reduced through the utilization of a minimum number of basic components which may be carried in stock at minimal expense and which provide almost limitless flexibility of design.

In accordance wth the present invention, a manufacturer need only stock several individual units each of approximately ten types of basic laminator components in order to manufacture upon a moment's notice a special laminator capable of performing a specialized task. In accordance with the invention, a laminator is constructed of a number of substantially identical component parts, insofar as size is concerned. The individual functions performed by a laminating apparatus are separated into approximately ten and an individual building-block or modular unit is constructed to perform each of the individual laminating functions. Preferably each unit has the same dimensions with width and height having dimensions an even multiple of the smaller dimension, such as for example 2 to 1 or 4″ to 8″. As a particular function is required to provide a given specialized form of lamination, the individual unit capable of providing that function is assembled into a frame along with and in rigid juxtaposition with other building-block units, with the result that a complete, integrated and very compact multi-function laminaing apparatus is readily constructed.

It is, accordingly, an object of the present invention to provide a simplified, multi-function laminating apparatus.

Another object of the invention is to provide a universally adaptable laminating apparatus which may readily be modified in the field.

A feature of the invention resides in the provision of modulator units constructed for inter-assembly in an expansible frame.

Another feature of the invention is the elimination of heavy, all-encompassing side plates and the substitution therefor of an adjustable skeleton frame accepting a plurality of small sub-frame units.

Yet a further object of the present invention is to provide a mass-produced series of components capable of satisfying all requirements of laminating apparatus of such specialized nature as heretofore impossible of mass-production.

Still other and further objects and features will at once become apparent from a consideration of the attached drawings and specification wherein a number of embodiments of the invention are shown by way of illustration only, and wherein:

Figure 1:
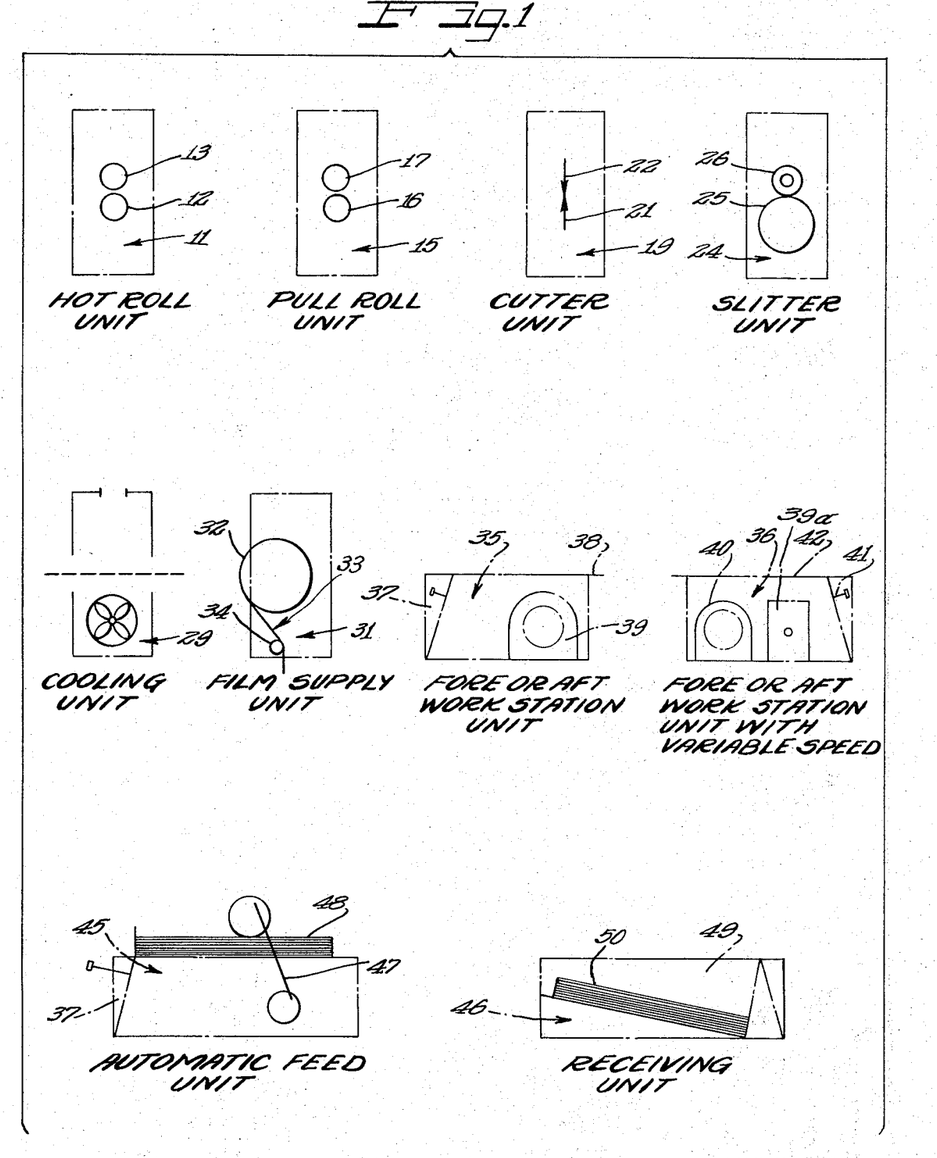
FIG. 1 comprises an exploded view, in end-elevation, and schematically, a plurality of individual functional modules or units constructed in accordance with the present invention.

As may be seen from a consideration of FIG. 1, a large number of separate, individual, modular units are constructed to provide, individually, a single function that may be required of a laminating apparatus. As illustrated, and as described in that figure, the hot roll unit 11 comprises a pair of heated rolls 12, 13 spring-biased toward each other. Similarly, the cold roll unit shown adjacent the hot roll unit comprises a pull roll 15 having a pair of rolls 16, 17 resiliently biased toward each other but normally running without the addition of heat. Cutter element 19 is provided downstream of the pull roll unit and is designed to transversely sever the laminating film leaving the laminating apparatus by means of a pair of vertically connecting knife blades 21, 22. The slitter unit comprises a main module 24 containing a large roll 25 against which a plurality of spaced disks 26 run in a manner longitudinally slitting the laminate leaving the pull roll unit 15. The cooling unit comprises a blower fan and is designed merely to circulate air over the film immediately following movement of the film through the hot roll unit. The film supply unit 31 provides a supply spool 32 carrying a film 33 which is trained around guide 34 for passage to a hot roll unit 11. The fore and aft work station units 35 and 36, respectively, provide for the entrance and the exit of the laminating product and material. The fore unit comprises a control panel 37, a work table or deck 38, and may be fitted with a drive motor and transmission generally indicated at 39 if the hot roll unit or pull roll units are provided immediately adjacent the fore work station. The rear or aft work station is positioned at the exit of the machine and in the embodiment shown at 36, incorporates a drive mechanism 40, a rear control panel 41 which may accommodate controls for the cutter, slitter and/or blower, as well as a work table surface 42. As a more sophisticated substitute for the fore and aft work stations, an automatic feed unit 45 receiving unit 46 may, respectively, be provided. The automatic feed unit provides the same control panel 37 but incorporates a sheet-feeding mechanism generally indicated at 47 capable of individually feeding sheets 48 from a stack, as shown, into the nip of a hot unit. A receiving unit 46 provides a bin area 49 for the accommodation of a plurality of laminated sheets 50 following their severence by the cutter unit 19.

It will be seen from a consideration of the above, that a large number of individual modules or units may be provided, each having substantially a single fundamental function and each having a dimensional configuration substantially identical to the others. This relationship may be more readily seen from a careful consideration of FIG. 2 through 7. As there shown, a series of representative combination laminator systems are illustrated. These combinations are intended in no way to limit the possible combinations but clearly illustrate the many possibilities available as a result of the unique construction of the component parts of the present system.

Figure 2:
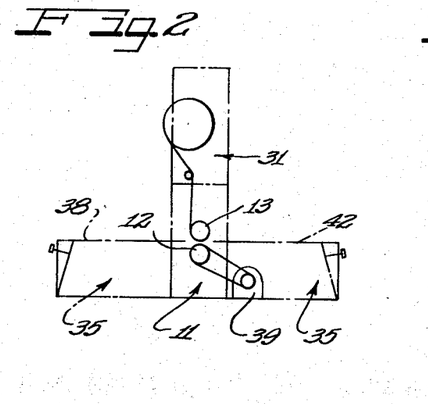
FIG. 2 is a side-elevational view of a laminating assembly of a simple one-sided configuration constructed in accordance with the invention.

In the embodiment illustrated in FIG. 2, a one side laminator is illustrated. It comprises a fore end work station 35, a laminator roll unit 11, an aft work station unit 35 carrying a drive motor 39, and a film supply unit 31. In the embodiment shown in FIG. 2 the top roll 13 is provided with a heating element while the bottom roll 12 may comprise a cold roll without a heating element or, alternatively, may comprise a conventional heating roll with the electrical power disconnected. The laminator of FIG. 2 comprises a minimum laminator assembly capable of accomplishing a relatively slow speed lamination of a product introduced on the surface 38 of the fore work station between the rolls 12, 13 and ejected onto the aft work table surface 42. The modulator of the system provides only minimal cost savings in the simple system of FIG. 2, although even in such a system it will be apparent that utilization of substantially identical fore and aft modules 35 and 35 permits a minimum number of components.

In the embodiment illustrated in FIG. 2 as well as the embodiments disclosed below and illustrated in FIGS. 3 through 5, the modular units are shown in juxtaposition but without separately illustrated securing means. The specific securing means are not illustrated but will be more specifically described below, in connection with the specific discussion of the embodiment illustrated in FIGS. 6 and 7.

Figure 3:
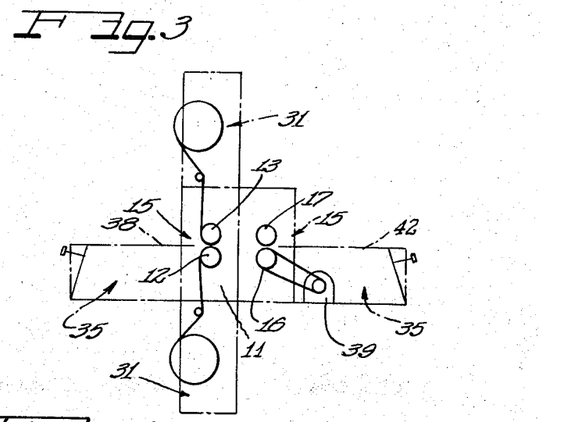
FIG. 3 is a modified form of the assembly shown in FIG. 2 with an additional film supply unit and modified drive system to permit two-sided lamination.

In FIG. 3 a laminator capable of providing conventional lamination of the most universally performed type is shown. There, the fore and aft work stations 35 feed and receive sheet material to a hot roll unit 11 having hot rolls 13 and 12. Film is supplied to the hot rolls 12 and 13 respectively from supply units 31 and is rapidly pulled between the rolls 12, 13 by the pull roll unit 15 having cold rolls 16 and 17 driven by means of the drive 39 found in the aft work station unit 35. The laminator system of FIG. 3 will, accordingly, laminate both sides of a sheet of paper or the like introduced between the rolls 12, 13 from the table 38 of fore work station 35.

A severing knife of any conventional form, not shown, may be attached to the aft work station 35 or, alternatively, a cutter unit 19 may be incorporated immediately downstream of the pull roll unit 15, in which event the drive motor 39 is provided with a longer belt, capable of passing through the cutter unit to the pull roll 15 for drive purposes.

Figure 4:
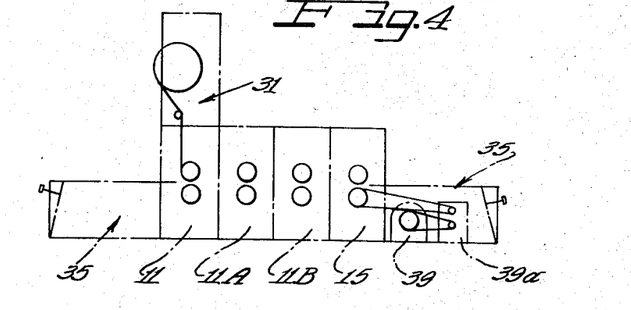
FIG. 4 is still a further form of the invention as applied to a single-sided laminator of a high speed type.

In FIG. 4 the special application features of the modular construction of the present invention are readily apparent. As there shown, the system is employed to provide an extremely high speed laminator for the application of a lamination of film to one side of a sheet of paper or the like. As can be seen, the system is essentially the same as that shown in FIG. 2 except that instead of providing a single hot roll unit 11, two additional hot roll stages 11A and 11B are provided. Additionally, a pull roll unit 15 is employed and is driven by a drive motor 39 by way of gear transmission unit 39a. As a result of this arrangement a production machine can be built capable of providing a high rate of heating and a high lamination speed. The application of heat is accomplished by means of the three pairs of hot rolls and the additional speed is provided by the utilization of the pull roll unit 15 which is driven at a higher than normal speed by means of the standard drive motor 39 operating through a geared transmission 39a to provide higher than usual speed of rotation of the pull rolls. Since, as those familiar with lamination are aware, the amount of heat available and the speed of lamination are critically interdependent, it will be apparent that what has heretofore been a relatively complicated problem of design can readily be solved by the present invention through the addition or subtraction of standard heating units and by the provision of a simple transmission 39a. It will be apparent that the transmission 39a may comprise a selected one of a group of different ratio transmissions or, alternatively, may comprise, where expense is a minor consideration, a variable speed transmission adjustable in operation to provide any one of a large range of output speeds for driving the pull roll unit 15. It will, of course, be apparent that slitting and servering units 24 and 19 may be employed with the high speed laminator of FIG. 4 if desired.

Figure 5:
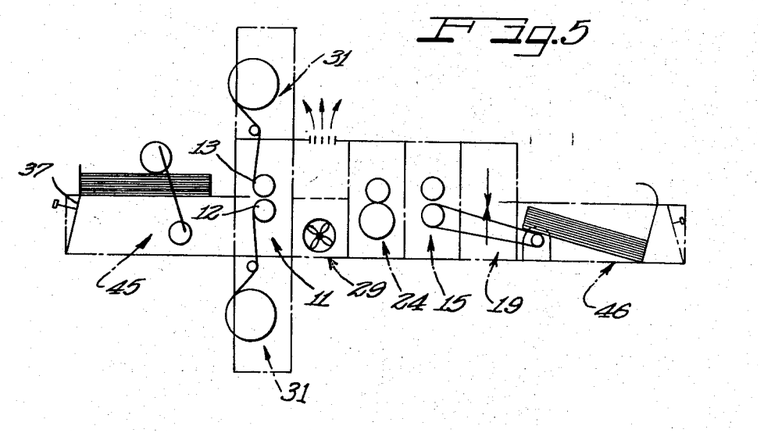
FIG. 5 is a sophisticated form of laminating apparatus constructed in accordance with the present invention and providing all of the functions ordinarly required of a high-cost laminating apparatus.

FIG. 5 illustrates another application of the present invention, in the form of a typical laminator capable for all-purpose operation. This laminator is adapted to substantially any lamination project. As there shown, the basic laminating is accomplished by a single hot roll stage 11 which is supplied, from both above and below, from supply units 31. Sheet paper is automatically fed from the automatic feed unit 45 between the hot rolls 12 and 13. Following lamination between the rolls 12 and 13, the laminated product passes through a cooling unit 29 where air is blown over the surface thereof to reduce its temperature. Immediately thereafter, the product is passed through a slitter unit 24 as above described through which it is pulled by a pull roll unit 15. The product is then severed in cutter unit 19 and stacked in the receiving unit 46.

It will be apparent from a consideration of the assembly of FIG. 5 that the feed and storage units 45 and 46 respectively have a length three times greater than the width dimension rather than two times as in the case with the other units. It will be appreciated that the units 45 and 46 comprise the front and rear end of the machine in all cases and, accordingly, the precise length of the units in the direction of lamination, is unimportant to the assembly relationship between the component parts. Accordingly, the units 35, 45 and 46 may be any length desired, although if possible it is preferred to employ units 35 of the same length-to-width relationship as the remaining components in order to utilize the end plates employed with all other units. This eliminates any special end plates and permits stocking an absolute minimum number of plates.

As has been discussed above, it is contemplated as a part of the inventive concept of our invention that the modular unit of the laminating apparatus be readily assembled into a rigid, unified assembly. The various arrangements of component parts illustrated in FIGS. 2 through 5 illustrate a number of possible combinations. These illustrations, however, had not included a supporting framework. It will be understood that a framework may be unnecessary where a one-sided laminator construction, such as shown in FIGS. 2 and 5, for example, is involved since devices of this sort may rest upon a table or other base surface. In such an event, the individual units are secured to one another in a manner described below. However, in a majority of commercial applications, it is desired that the laminating apparatus comprise a unitary structure having a built-in base. Such an arrangement is shown in FIGS. 6 and 7.

Figures 6, 7:
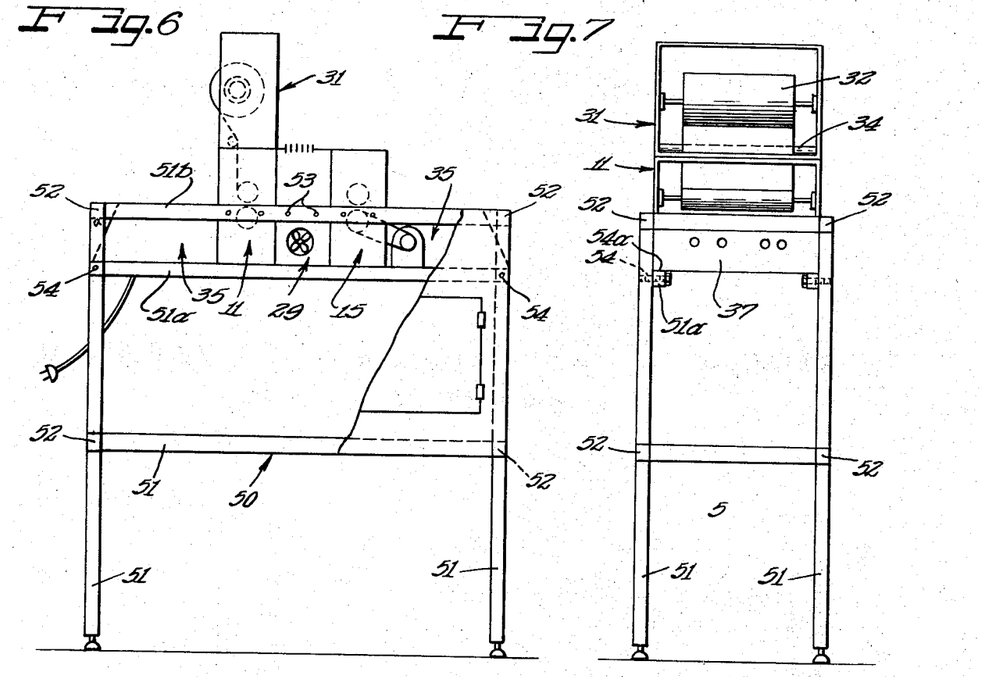
FIG. 6 illustrates an embodiment of the invention generally similar to that illustrated in FIGS. 2 and 3 as applied to the supporting and rigidifying frame element.
FIG. 7 is an end-elevational view of the apparatus shown in FIG. 6.

As shown in FIGS. 6 and 7, a frame 50 is provided to accommodate a one-sided laminating apparatus composed of fore and aft work station units 35, a hot roll unit 11, a supply unit 31, a cooling unit 29 and a pull unit 15. The frame 50 is constructed in the manner providing complete universality. It is composed of cut-to-size square tubing sections 51 joined at the ends by means of T and L units 52 which structures are commercially available in various forms but an eminently satisfactory frame may be constructed in accordance with the components marketed by Apton, a division of Dexion, Inc., of Woodside, N.Y. In accordance with such a system, the tubing 51 is cut to length to provide rails 51a, 51b which are interconected with the laminator unit to provide a rigid and yet extremely simple support. As shown, rail 51b is conected to the legs 51 by T elements 52 and is in turn secured by means of equally spaced screw apertures and screw connectors 53 to the respective laminator unit. The end plates of the individual laminator units are drilled and tapped along a line slightly removed from the centerline thereof so that the top surface of the fore and aft work stations 35 is essentially flush with the top surface of the horizontal rails 51b. This provides an extension of the work or table surface and provides an uncluttered appearance as well. Horizontal rails 51a are, in the embodiment illustrated, rigidly secured to the legs 51 by screws 54 in a position directly underneath the laminator units. Accordingly, a shelf surface 54a is provided above each of the supports 51a upon which the laminator units rest. It is, of course, within the scope of the present invention to secure by means of bolts or other semi-permanent fastening means, the individual units to the supports 51a. However, in view of the dual screw fastening of each of the individual units by means of screws 53, it has been found sufficient to merely position the laminator units upon the supports 51a without providing rigid securement therebetween. However, if excessive vibration is present in the area in which the laminator is located and operating, this additional rigidification of the system may well be warranted. However, due to the close proximity of the individual laminator units to each other, the provision of two screws 53 in each end plate of each unit provides a rigid immovable base and assembly combination.

The framework 50 is an extremely efficient construction when coupled with the modular units described above. The horizontal supports 51 may readily be cut into predetermined lengths comprising even multiples of the width dimension of the individual units. Accordingly, no "special" framing construction is required and the frame for a laminator unit may be readily constructed merely with knowledge of the number of individual laminator units coupled with the actual length dimensions of the fore and aft work stations. It will, of course, be understood that the frame may be dispensed with unless double-sided lamination is desired. For example, the structures of FIGS. 2, 4 and 6 all comprise single-sided laminating constructions in which the individual units may rest upon a table top or like surface. In such circumstances, the individual units are rigidly secured to each other. This rigid interconnection is readily achieved as a result of the specific construction of the individual units as hereinafter more specifically described.

Figure 8:
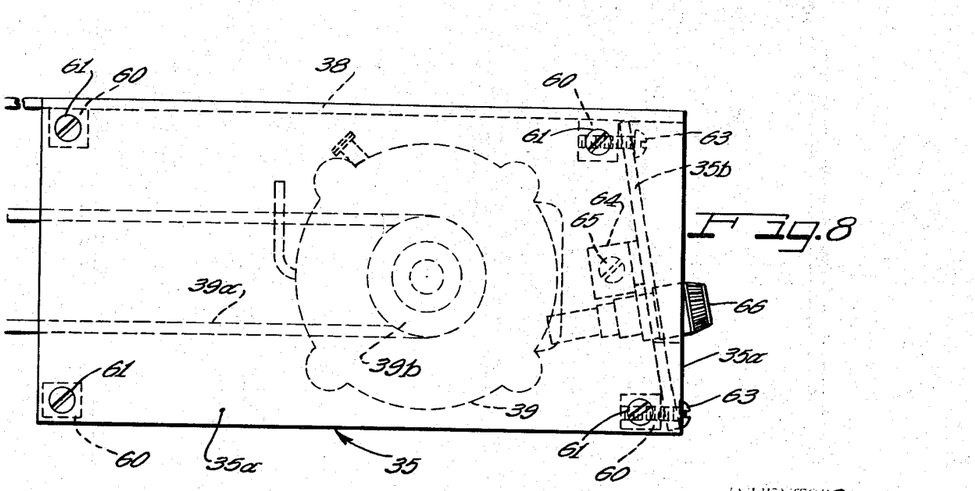
FIG. 8 is an enlarged, end-elevational view of a work station unit constructed in accordance with this invention.
Figure 9:
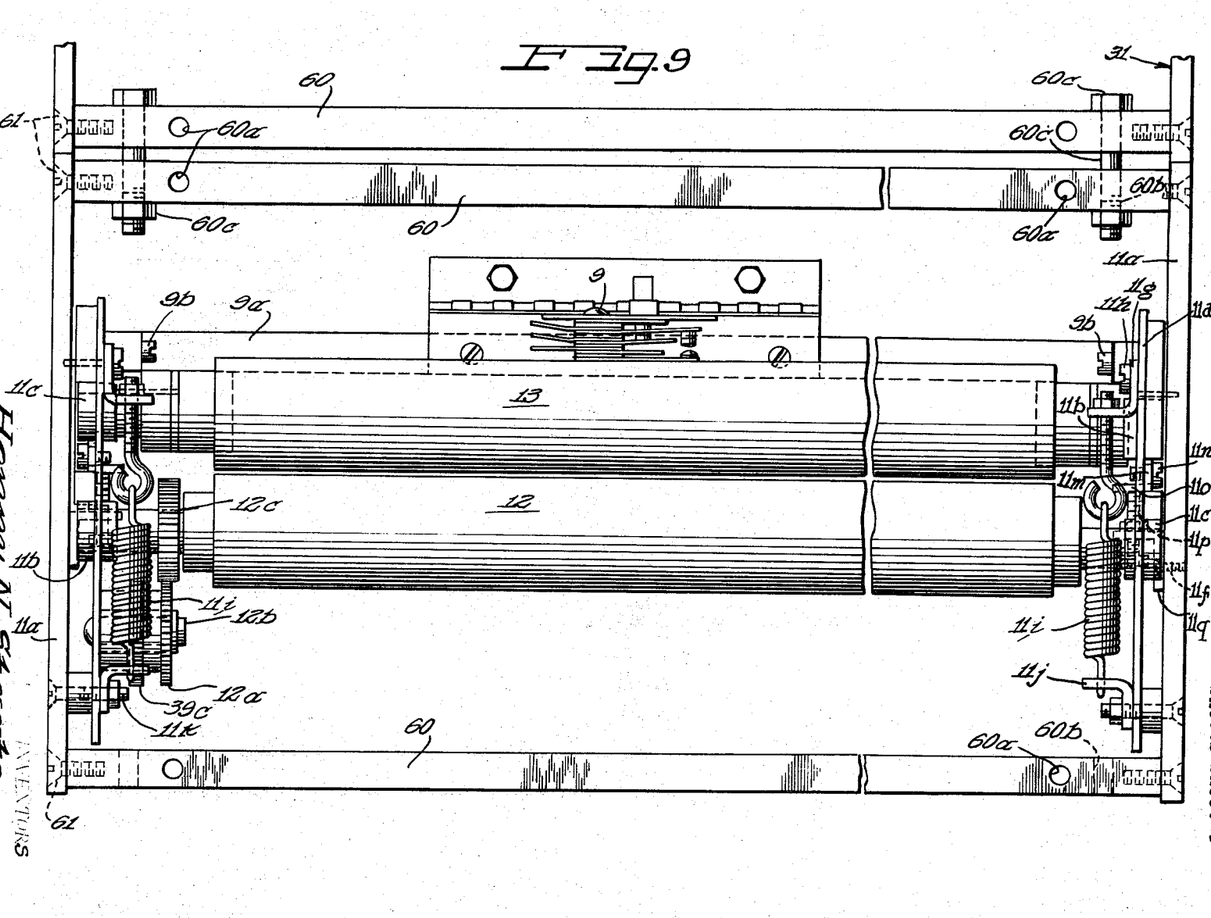
FIG. 9 is a side-elevational view of a hot roll modular unit constructed in accordance with the invention.
Figure 10:
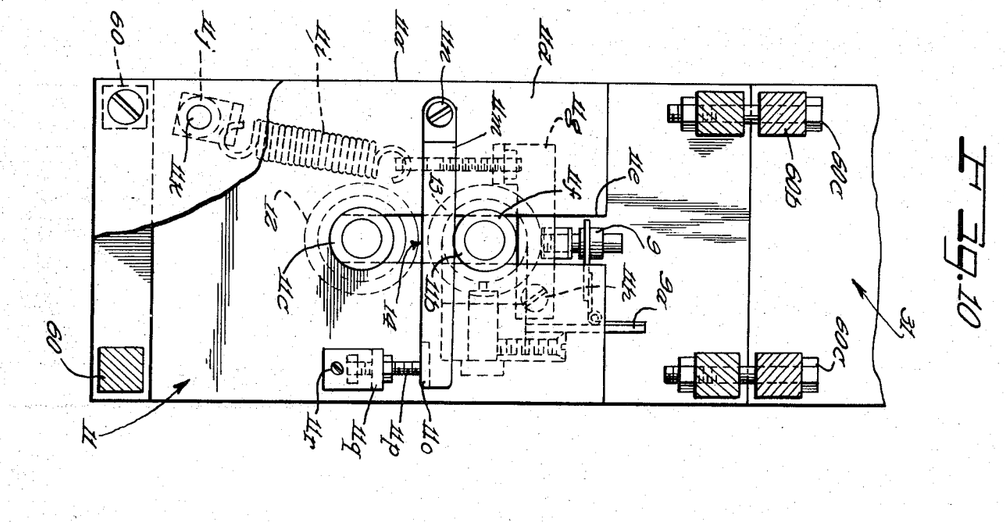
FIG. 10 is an end-elevational view of the hot roll modular unit shown in FIG. 9.
Figure 11:
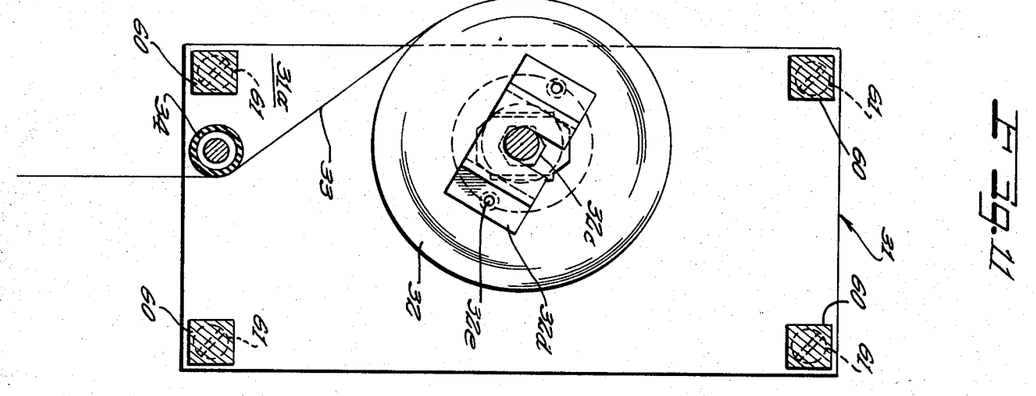
FIG. 11 is an end-elevational view of a film supply roll constructed on the modular concept of the present invention.

In FIGS. 8 through 12 detailed aspects of exemplary units are shown, by way of illustration. Thus, FIG. 8 shows an end-elevational view of the aft work station unit, FIG. 9 shows a side-elevational view of the hot roll laminating unit, FIG. 10 shows an end-elevational view of the hot roll unit shown in FIG. 9, FIG. 11 illustrates an end elevational view of a film supply unit, and FIG. 12 comprises a side-elevational view of the film supply unit shown in FIG. 11. Each of the units is provided with end plates of identical dimensions. In actual practice a 4" x 8" dimension has provide very satisfactory. Further, each pair of end plates is maintained in exactly the same spaced position by means of four rectangular spacing rods or separator elements 60. The spacing rods 60 may be of any cross-sectional configuration but it has been found preferable to construct them of a square cross-section. In practice, the manufacture of the spacing rods 60 is very satisfactorily accomplished in the form of square extrusions of aluminum alloy or the like having the exterior configuration of a square and a central hole continuing through the length of the rod and having a diameter approximating the root diameter of the screws 61. As a result of this arrangement the tubular hole 62 may be tapped at its end without necessitating any drilling operation. The rods 60 and other components of any given laminating apparatus may be of any desired length thereby providing great flexibility as to laminating width.

As a result of the above generally described construction, each individual laminating unit comprises a rectangular element composed of two end plates and four transversely extending spacing rods 60 secured to the end plates by means of screws 61. In accordance with the preferred embodiment of the present invention, the interior constructional details of each unit are encompassed within the confines of that unit so that substantially no interference can occur between individual units. This relationship will be more fully appreciated from the individual descriptions of the several laminator units described below.

FIG. 8 illustrates an end-elevational view of the aft work station 35. It comprises end plates 35a secured together by spacing rods 60 rigidly secured to the end plates by means of screws 61. An electric motor 39 is rigidly secured to one or the other of the end plates 35a by any conventional form of bracket means. The motor 39 is provided with a drive belt 39a entrained over the motor pulley 39b and extending from the peripheral confines of the unit 35 to the next adjacent unit for driving the latter. A control panel 35b is rigidly secured to the rearmost, or trailing, spacing rods 60, as shown in FIG. 8, by means of screws 63, and supplemental securing bracket 64 secured by screws 65 to the end plate 35a. The panel 35b may readily be employed as a control panel through the application of, for example, control switch 66 electrically connected to the motor 39 as well as to the electrical circuit controlling the heating of the hot laminator rolls or similar controls. For the sake of appearance, the panel 35b is tilted from the vertical but it will, of course, be understood that this tilt is mainly a matter of style rather than function. On the other hand, the work table surface 38 is secured flush with the top surface of the end plate 35a in a manner not only improving the appearance of the apparatus as a whole, but also substantially increasing the work table area without expense. The flush placement of the surface plate 38 is readily accomplished by positioning the individual spacing rods 60 a distance from the next adjacent edges of the end plates equalling approximately the thickness of the work table surface. This permits the efficient and decorative enclosure of the system should it be desired, wtihout in any way affecting its over-all operation.

By providing a slight inset of each of the securing rods 60 relative to the peripheral edge of its end plate, it is possible to provide a covering element for substantially the entire machine, if covering the machine becomes desirable. In factory operation, it is ordinarily unnecessary to provide complete covering for the machine since maintaining the machine in its open condition simplifies mechanical adjustment of the components.

The utilization of end plates and securing rods of identical outer dimensions for the hot roll unit 11 is more clearly illustrated in FIGS. 9 and 10. As there shown, the end plates 11a are spaced by securing rods 60 secured by screws 61. The end plates 11a are each provided with bearing supports 11b and 11c for the upper and lower heating rolls 13 and 12 respectively. The bearings 11b, 11c, may be welded to the end plates 11a if desired or, alternatively, the bearings 11b, 11c, may be resiliently secured to the end plates 11a by a number of means, but it is preferred that the spacing between the rolls 12, 13, be resiliently adjusted. In the embodiment illustrated, the bearings 11c are rigidly secured to the plates 11a by welding or otherwise, and a guide channel plate 11d is secured to the inside edge of each of the plates 11a. The plates 11d each have a vertically extending slot 11e which cooperate with flats 11f on the upper bearings 11b to cause the bearings 11b to move vertically without rotation. The bearings 11b are biased downwardly by means of lever arm 11g pivotally mounted at 11h and urged downwardly by means of springs 11i secured to bracket clips 11j which are in turn screwed to the respective end plates 11a by means of a conventional fastener 11k. Stop means are provided for preventing downward movement of the bearings 11b beyond a predetermined adjustment point. These stop means comprise pivoted links 11m pivotally mounted on screws 11n. Levers 11m carry a tab 11o struck laterally outwardly therefrom for cooperation with an adjusting screw 11p threadedly carried by brackets 11q which is secured to the plate 11a by a screw 11r or the like. As a result of this arrangement the distance between the rolls 12, 13, defined as the nip 14 is adjustable to a minimum dimension and is biased to that dimension by the spring 11i.

The bottom roll 12 is preferably directly driven from a motor unit, such as motor 39, or the like, by means of a drive sprocket 39c pivotally mounted on the left-hand plate 11a as viewed in FIG. 9. The sprocket 39 is directly drivingly connected to gear 12a rotatably mounted on pivot 12b which in turn is directly geared to gear 12c on roll 12. Roll 13 may be directly geared to gear 12c, if desired, or, alternatively, the roll 13 may be permitted to revolve freely, and to rotate only with the application of rotary forces by the passage of film therebetween under the influence of the drivingly rotating roll 12.

Either one or both of the rolls 12, 13, may be heated by means of heating coils embedded therein. The specific configuration of the heating coils, and of the thermostat generally indicated at 9 in FIGS. 9 and 10, form no part of the present invention except that it may be observed that the mounting of such elements as the thermostat 9 in the modular unit of the present invention may readily be accomplished through the attachment of a securing extension 9a between end plates 11a in a rigid manner, such as for example by screws 9b.

Figure 12:
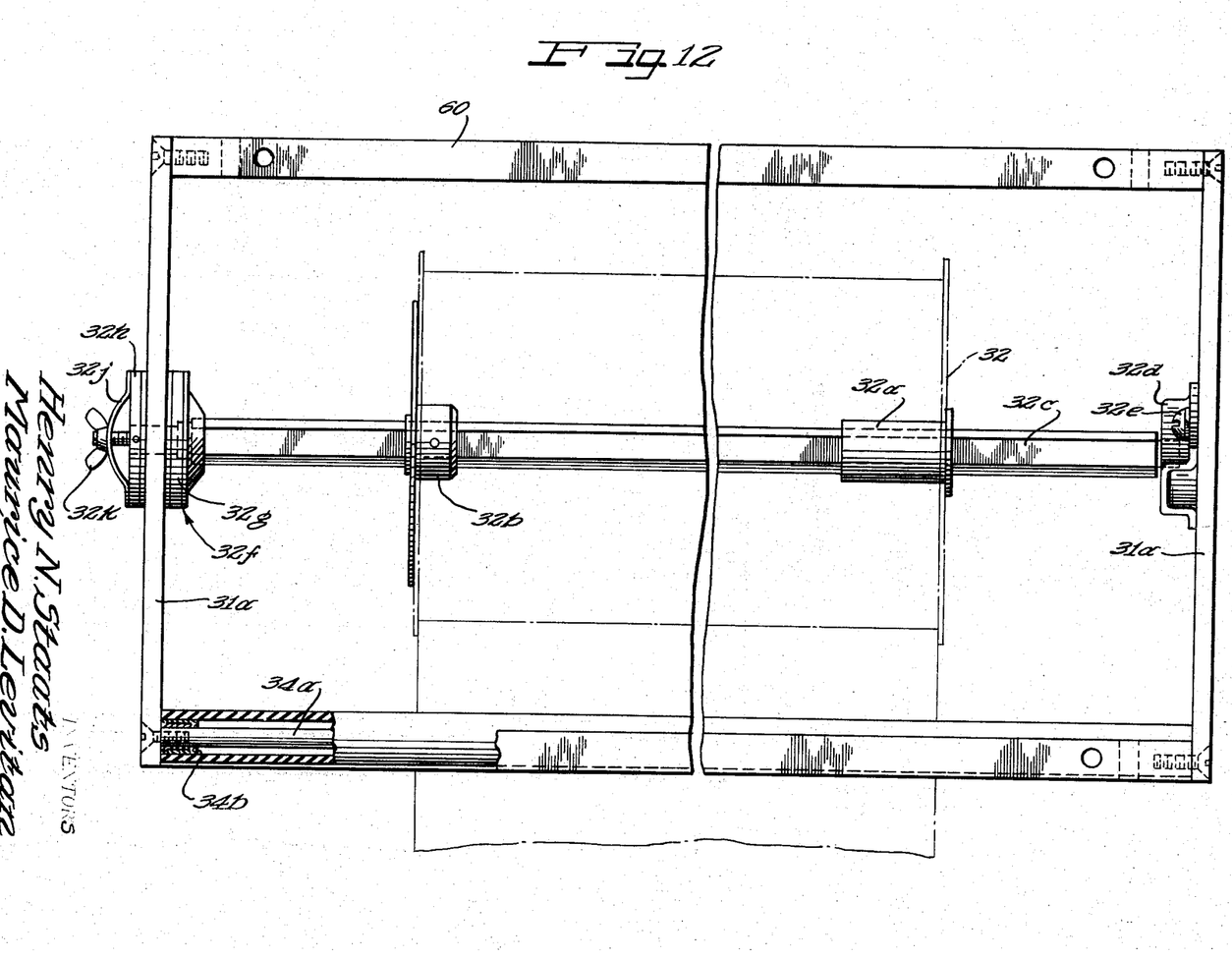
FIG. 12 is a side-elevational view of the film supply unit shown in FIG. 11.

Laminating film supply roll units of the type shown at 31 in FIG. 1 are more fully illustrated in FIGS. 11 and 12. There, the end plates 31a are, again, rigidly secured in spaced relation by the spacing rod 60 secured by screws 61. A supply spool 32 is mounted on bushings 32a, 32b splined to shaft 32c having, in the form illustrated, a hexagonal cross-section. The shaft 32c is freely rotatable in a bearing support 32d secured to the right-hand end plate 31a. as viewed in FIG. 12. by screws 32e. At the opposite end plate 31a, shown at the left in FIG. 12, a friction brake is provided. The brake, 32f comprises friction plates 32g and 32h resiliently biased against plate 31a by spring 32j the tension of which may be adjusted by a thumb nut 32k. The film 33 freely passes over a guide roller 34 rotatably supported upon rod 34a by bearings 34b. In the form illustrated, the spool 32 is shown mounted slightly eccentrically relative to the end plates 31a but it will be understood that the invention contemplates centering the shaft 32c relative to the end plates 31a to prevent projection of the spool beyond the peripheral edges of the unit. This may be desired in instances in which it is preferred that the film supply unit be provided with sheet metal covers or the like, in the manner of the application of the work table surface 38 of the work stations 35.

An example of the securement of individual modular units to one another is readily seen from a consideration of FIGS. 9 and 10. There, the hot roll laminator unit 11 is rigidly secured to the film supply unit 31. This is accomplished by providing each of the spacing rods 60 with securing means such as transverse bolt apertures 60a and 60b as illustrated. With this arrangement, bolts 60c may be provided to secure the units end to end, as shown in FIGS. 9 and 10, or in side to side relationship, not shown. In the side to side relationship, the transverse holes 60a are employed rather than the hole 60b employed in the embodiment illustrated.

It will, from the above detailed description, be apparent that an extremely versatile system of constructing laminating devices has been provided by the present invention. Substantially any laminating problem can readily be solved merely by securing a plurality of selected modular units together as above suggested. Although a large variation in functions is thus readily achieved, this variation is accomplished without requiring the manufacturer to deal in special sizes of components. Accordingly, the laminating apparatus may be "designed" for any given special utility in a matter of moments rather than the many hours heretofore required. In view of the dimensional uniformity of the components, a very small number of individual parts need be stocked by the manufacturer.

It will be apparent to those skilled in the art that individual systems other than those specifically illustrated may readily be accomplished without departing from the scope of the present invention. For example, the laminator roll unit 11 may be operated with the roll limit stops 11p completely out of contact with the lever 11m, thereby permitting the rolls 12, 13 to contact each other. In such circumstances, the rolls operate as pull rolls to pull the laminating film through the system independently of the thickness of the product and sheet film being laminated. In the circumstances in which the stops are employed to hold the rolls 12, 13 apart, the rotation of one or the other of the rolls 12, 13, will not cause a lamination of the product until the insertion of a product of a thickness, combined with the thickness of the laminating film, greater than the distance between the rolls 12, 13. In such circumstances, a separate pull roll unit 15 is required. It will be apparent that the laminating roll unit 11 may be operated as a cold pressure laminating device by the disconnection of the electrical heating elements. It will further be clear that a number of motors 39 may be employed operating at the same or slightly differing speeds, depending upon the needs of the system. In any event, however, it is contemplated that the motors be provided within the confines of the individual units secured adjacent the laminating unit 11 or the pull roll unit 15 so that drive belts, of either the rubber or sprocket type may readily be employed to transfer power from the motor to the driven unit.

We claim as our invention:

1. A laminator device comprising at least four different type units such as a laminating roll unit, a pull roll unit, a film supply unit, a cutter unit, a slitter unit, a cooling unit, a fore and aft worktable unit, a feed unit, and a receiving unit, said different type of units being arranged in a desired order to perform a desired sequence of steps in a laminating process, the improvement comprising each of said units being a modular unit having rectangular end plates spaced apart by separator elements to define a modular structure for receiving the working parts for the particular unit, each of said rectangular end plates having a length equal to an even multiple of the width, said separator elements of each modular unit having the same length to define the width of the laminator device, each of said modular units being provided with securing means cooperable with complementary securing means on another modular unit for securing said modular units together in a cooperable position, said securing means being disposed on each of said units in a predetermined position to enable securing to any of the other units, said modular structure enabling assembly of various different types of units in any desired order to form a laminator device to perform a desired laminating process.

2. A laminator device according to claim 1, wherein the cooperable securing means on each of the modular units is disposed on the separator elements.

3. A laminator device according to claim 2, wherein the securing means cooperating to hold a pair of said modular units together includes fastening means extending through aligned apertures provided on the respective separator elements.

4. In a laminator apparatus comprising a film supply unit and a laminating roll unit and at least two other units such as a laminating roll unit, a pull roll unit, a cutting unit, a slitter unit, a cooling unit, and a fore and aft worktable unit, the improvement comprising each of said units being a modular unit having a rectangular end plate being spaced apart by rigid separator elements, each of said end plates having a length equal to an even multiple of the width, said separator elements of each modulator unit having the same length to define the width of the laminator apparatus, each of said modular units having means cooperable with like means on another modular unit for securing said modular units together in a cooperable position adjacent each other to provide a continuous unitary laminating structure.

References Cited
UNITED STATES PATENTS

| | | | |
|---|---|---|---|
| 333,781 | 1/1886 | Quigley | 156—516 |
| 2,234,223 | 3/1941 | Ball | 156—516 X |
| 3,049,167 | 8/1962 | Vesak | 156—269 X |
| 3,058,869 | 10/1962 | Cohen et al. | 156—351 X |
| 3,236,714 | 2/1966 | Traut | 156—583 X |
| 3,258,380 | 6/1966 | Fischer et al. | 156—269 X |
| 3,411,388 | 11/1968 | Rappaport | 156—510 X |

VERLIN R. PENDEGRASS, Primary Examiner